United States Patent [19]
VanZeeland et al.

[11] Patent Number: 5,307,193
[45] Date of Patent: Apr. 26, 1994

[54] CONTROL SIGNAL REPEATER SYSTEM

[75] Inventors: Anthony J. VanZeeland, Mesa; John R. Berkheimer, Tempe, both of Ariz.

[73] Assignee: Go-Video Inc., Scottsdale, Ariz.

[21] Appl. No.: 989,941

[22] Filed: Dec. 10, 1992

Related U.S. Application Data

[63] Continuation of Ser. No. 642,661, Jan. 17, 1991, abandoned.

[51] Int. Cl.⁵ .............................. H04B 10/00
[52] U.S. Cl. .................... 359/145; 359/142; 359/146; 340/825.69; 340/825.71
[58] Field of Search ............ 359/142, 145, 146, 147, 359/148, 176; 455/128, 129, 351, 352; 340/825.69, 825.71

[56] References Cited

U.S. PATENT DOCUMENTS

| | | | |
|---|---|---|---|
| 3,887,925 | 6/1975 | Ranghelli et al. | 343/795 |
| 4,430,757 | 2/1984 | Szakvary | 455/128 |
| 4,509,211 | 5/1985 | Robbins | 359/145 |
| 4,809,359 | 2/1989 | Dockery | 359/145 |
| 4,864,647 | 9/1989 | Harrington | 359/145 |
| 4,987,424 | 1/1991 | Tamura et al. | 343/795 |
| 5,049,810 | 9/1991 | Kirby et al. | 324/156 |
| 5,109,222 | 5/1992 | Wetty | 340/825.72 |

Primary Examiner—Raphael Bacares
Attorney, Agent, or Firm—Donald A. Streck

[57] ABSTRACT

This is a method and associated apparatus for operating a control signal repeater system to receive infrared (IR) control signals at a first location and cause duplicate control signals to be input at a second location to an IR-controlled device containing an IR detector with connecting wires without creating a duplicate IR signal at the location of the controlled device. This is accomplished by directing voltage-inducing energy into the wires of the IR detector in the controlled device so that the signals are induced directly into the wiring to be amplified and used without the need for first generating an IR beam into the IR detector.

18 Claims, 2 Drawing Sheets

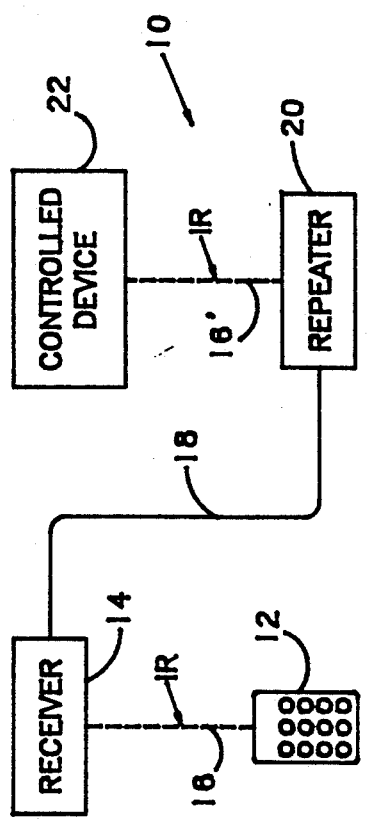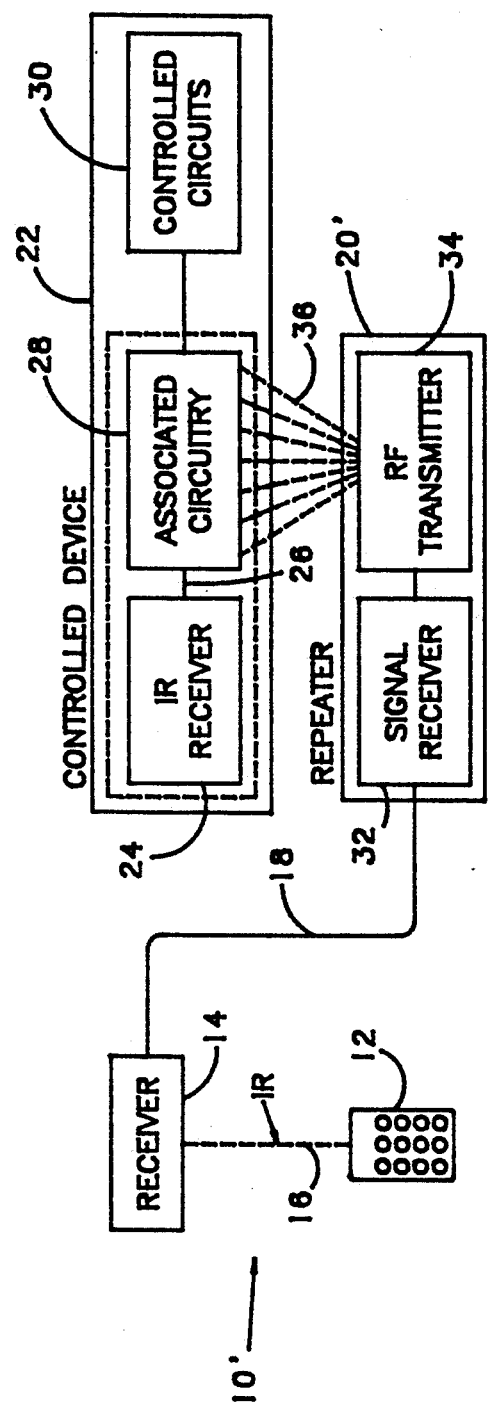

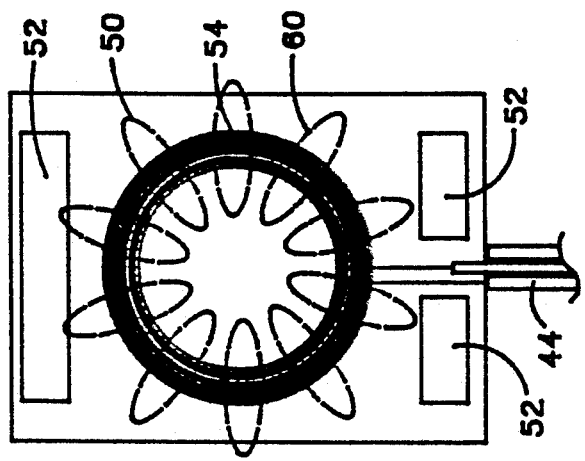
FIG. 6
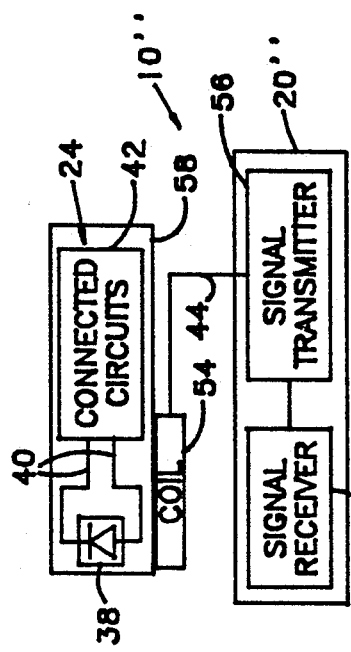
FIG. 3
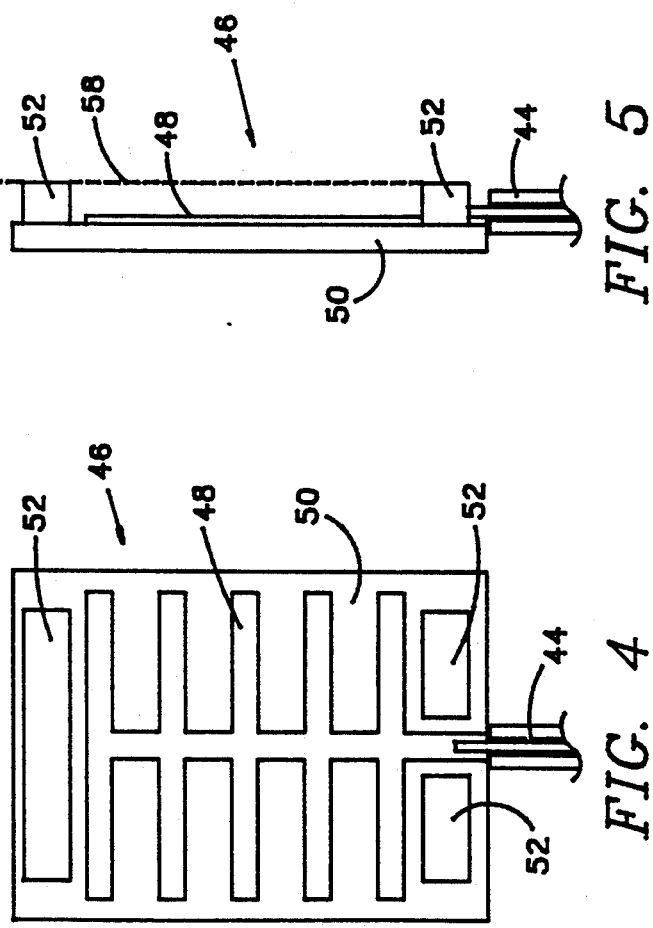
FIG. 7
FIG. 5
FIG. 4

CONTROL SIGNAL REPEATER SYSTEM

This application is a continuation of Application Ser. No. 642,661 filed Jan. 17, 1991, now abandoned.

BACKGROUND OF THE INVENTION

This invention relates to repeater systems for repeating a control signal input at one location at a second location and, more particularly, in a control signal repeater system for receiving infrared (IR) control signals by a receiver at a first location and for outputting a first signal containing control information from the IR control signals to a second location where duplicate control signals are input to an IR-controlled device containing an IR detector with connecting wires, to a signal repeater for controlling the IR-controlled device without creating a duplicate IR signal at the location of the controlled device comprising, signal receiver means at the second location for receiving the first signal from the receiver and for outputting a second signal containing the control information from the IR control signals; and, signal transmitter means for transmitting an energy signal into the connecting wires of the IR-controlled device to induce voltage signals therein containing the control information from the IR signal repeater for a control signals.

Infrared controls are commonly used for remotely controlling televisions, VCRs, and the like. Such controls are light-weight and operate almost indefinitely from the power of a small battery or batteries. By pressing a button on the controller, the user causes a beam of infrared (IR) energy modulated with a unique control signal to be directed at the controlled device from the user's location. The device is thus controlled in its functions without the necessity of the user leaving his location and going to the device.

Over the years, various systems for repeating the IR control signals so that the user does not have to be in a line-of-sight relationship with the controlled device have been made available in the art. Such prior art repeater systems generally appear as the system 10 shown in FIG. 1. At the remote location, the standard controller 12 is pointed at a receiver 14. The IR beam 16 from the controller 12 is detected by the receiver 14 which then transmits the signal electrically over the connection 18 to the repeater 20. The repeater 20 then directs a duplicate IR beam 16' towards the controlled device 22. Numerous such systems have been patented with the principle difference being the form of the connection 18. Early systems employed wires as the connection 18 whereas later systems substituted a wireless link (such as radio frequency) for the earlier wires. In each case, however, the problem is with the repeater 20. As depicted in the drawing figure, it must be positioned in front of the controlled device 22 so that the controlled device 22 can receive the duplicate IR beam 16'. While such systems appear fine in the abstract of a patent application, in actual implementation it is quite often inconvenient to place the repeater 20 in such a relationship with the controlled device—particularly where power must be connected to the repeater 20. While the controller 12 could conveniently sit on a table next to the user because of its small size and battery operation, a repeater 20 requiring power from a wall outlet connection and of considerably larger size can be a real inconvenience.

With the recent advent of so-called ""wireless video"" on a commercially viable basis, such repeater systems have become far more important. Now that the television set, for example, can be taken anywhere in the house or yard and still receive signals broadcast locally by a VCR, the ability to control the functions of the VCR from the location of the television set is far more important. In systems which combine the wireless broadcasting of the video and audio signals in one direction with the broadcasting of the control signals in the opposite direction, unitary construction is also very desirable and the requirement of a separate repeater 20 does not fit in with such objectives.

Wherefore, it is an object of this invention to provide a control signal repeater system which can accept IR control signals at a remote location and activate an IR-controlled device at a second location without the need for a separate repeater box emitting a duplicate IR beam at the controlled device.

It is another object of this invention to provide a control signal repeater system which can be incorporated conveniently into a bi-directional wireless video system.

It is still another object of this invention to provide a control signal repeater system which can be employed with a bi-directional wireless video system and receive any power requirements from that system and thereby eliminate the requirement for a separate power supply for the repeater system.

Other objects and benefits of the invention will become apparent from the detailed description which follows hereinafter when taken in conjunction with the drawing figures which accompany it.

SUMMARY

The foregoing objects have been achieved by the control signal repeater system of the present invention for receiving infrared (IR) control signals at a first location and for causing duplicate control signals to be input at a second location to an IR-controlled device containing an IR detector with connecting wires without creating a duplicate IR signal at the location of the controlled device comprising, receiver means at the first location for receiving the IR control signals and for outputting a first signal containing control information from the IR control signals; signal receiver means at the second location for receiving the first signal from the receiver means and for outputting a second signal containing the control information from the IR control signals; and, signal transmitter means for transmitting an energy signal into the connecting wires of the IR-controlled device to induce voltage signals therein containing the control information from the IR control signals.

In the preferred embodiment, the signal transmitter means comprises antenna means disposed close adjacent to the connecting wires and transmitter means connected to the antenna means for transmitting the energy signal into the antenna means.

Further in the preferred embodiment, the antenna means comprises a radio frequency (RF) antenna and the transmitter means comprises an RF transmitter.

In an alternate embodiment, the antenna means comprises a conductive coil and the transmitter means comprises a current signal transmitter.

For easy mounting close to the required site, the antenna means comprises, a printed circuit board (PCB); a conductive pattern on the PCB; and, attachment means for attaching the PCB to the IR-controlled device close adjacent the connecting wires. The preferred attachment means comprises adhesive attachment means for adhesively fastening the PCB to a surface of a case of the IR-controlled device adjacent the connecting wires.

DESCRIPTION OF THE DRAWINGS

FIG. 1 is a simplified drawing of a prior art control signal repeater system where infrared inputs are duplicated as infrared signals at a remote location.

FIG. 2 is a simplified drawing of a control signal repeater system according to the present invention in a preferred embodiment where infrared inputs are duplicated as radio frequency signals at a remote location.

FIG. 3 is a simplified functional block diagram showing the preferred way in which the radio frequency signals at a remote location are coupled into the controlled device when using the system of FIG. 2.

FIG. 4 is a simplified top view drawing of a radio frequency antenna that could be employed in the manner shown in FIG. 3.

FIG. 5 is a simplified side view drawing of the antenna of FIG. 4.

FIG. 6 is a simplified functional block diagram showing an alternate way in which non-infrared signals can be coupled into the controlled device.

FIG. 7 is a simplified top view drawing of a loop antenna that could be employed in the manner shown in FIG. 6.

DESCRIPTION OF THE PREFERRED EMBODIMENT

The present invention achieves its objectives by directly inducing the duplicate signal into the control circuitry of the controlled device and eliminating the need for a duplicate IR signal. The way in which it accomplishes this result in a preferred embodiment is shown in simplified form in FIG. 2 where it is generally indicated as 10'. As in the prior art system of FIG. 1, there is a receiver 14 for receiving the IR beam 16 from the controller 12 at the remote location and a connection 18 to the repeater 20'. The connection 18 can be of any type; however, a wireless connection is preferred with the receiver 14 being incorporated into one of the units of the wireless system and deriving its power requirements therefrom and repeater 20' being incorporated into the other of the units of the wireless system and likewise deriving its power requirements therefrom.

As depicted in FIG. 2, the typical controlled device 22 includes an IR receiver 24 for receiving the IR beam 16 from the controller 12 and outputting a weak electrical signal on connection 26 to the associated circuitry 28 which then amplifies the signal, removes the control information therefrom, and then controls the controlled circuits 30 connected thereto as a function of the signals input by the user with the controller 12.

According to the present invention in its preferred embodiment, the signal from the receiver 14 is received by a signal receiver 32 which amplifies the signal, removes the control information therefrom, and then outputs a radio frequency (RF) signal containing the control information from the RF transmitter 34 connected thereto. The RF radiation 36 from the transmitter 34 induces voltage signals into the associated circuitry 28 containing the control information. Just as with the weak signals from the IR receiver 24, these induced voltage signals are amplified, the control information removed therefrom, and then used to control the controlled circuits 30 connected thereto by the associated circuitry 28 of the controlled device 22.

Turning now to FIGS. 3-5 with particularity, the preferred manner of accomplishing the foregoing will now be described in detail. As depicted in FIG. 3, the IR receiver typically includes a photodiode 38 connected by wires 40 to the immediately-following connected circuit 42. The RF transmitter 34 is connected by a light-weight co-axial cable 44 to a small directional antenna 46 which is placed as close as possible to the photodiode 38 and wires 40. For this purpose, the antenna 46 can be constructed in a manner similar to that shown in FIGS. 4 and 5. The antenna 46 is actually formed as an appropriate pattern of conducting material 48 on the surface of a printed circuit board (PCB) 50. By employing double-sided adhesive foam tape 52, or the like, the antenna 46 can be attached easily by a user to the underside of the case 58 of the controlled device 22 adjacent the IR input (containing the photodiode 38 therebehind) when installing the wireless transmitting unit to the device 22. As thus configured and with the close proximity between the antenna 46 and the photodiode 38 and connecting wires 40, the power output of the RF transmitter can be kept quite low. When incorporated into a wireless video transmitting system as is preferred, components with common functions can, of course, be shared where possible.

An alternate approach according to the present invention is shown in FIGS. 6 and 7. In this approach, the inducing of the control voltages is accomplished by magnetic inductance rather than by the use of RF energy. The antenna on the PCB 50 is replaced by a conductive coil 54 and the RF transmitter 34 is replaced with a signal transmitter 56 which outputs a current signal which causes the coil 54 to develop a modulated magnetic field 60 which, in turn, induces the desired voltage signal into the wires 40 and the like.

Thus, it can be seen from the foregoing description and associated drawings that this invention has met its stated objectives by allowing an IR controlled device to be controlled from a remote location without the need of creating a duplicate IR signal at the site of the controlled device.

Wherefore, having thus described the present invention, what is claimed is:

1. A control signal repeater system for receiving infrared (IR) control signals at a first location and for causing duplicate control signals to be output at a second location to an IR-controlled device at a third location which includes an IR detector with connecting wires, without directing a duplicate IR control signal into the IR-controlled device, comprising:

a) receiver means at the first location for receiving the IR control signals and for outputting a first signal containing control information from the IR control signals;

b) signal receiver means at the second location for receiving said first signal from said receiver means and for outputting a second signal containing said control information from the IR control signals;

c) signal transmitter means at the second location for receiving said second signal and for transmitting a non-light energy signal directly into said connecting wires of the IR-controlled device to induce voltage signals therein containing said control information from the IR control signals whereby said IR detector is bypassed; and wherein, d) the IR-controlled device at the third location has said connecting wires connecting said IR detector to a control logic which responds to electrical control signals in said connecting wires.

2. The control signal repeater system of claim 1 wherein said signal transmitter means comprises:
   a) antenna means disposed close adjacent to the connecting wires; and,
   b) transmitter means connected to said antenna means for transmitting said energy signal into said antenna means.

3. The control signal repeater system of claim 2 wherein:
   a) said antenna means comprises a radio frequency (RF) antenna; and,
   b) said transmitter means comprises an RF transmitter.

4. The control signal repeater system of claim 2 wherein:
   a) said antenna means comprises a conductive coil; and,
   b) said transmitter means comprises a current signal transmitter.

5. The control signal repeater system of claim 2 wherein said antenna means comprises:
   a) a printed circuit board (PCB);
   b) a conductive pattern on said PCB; and,
   c) attachment means for attaching said PCB to the IR-controlled device close adjacent the connecting wires.

6. The control signal repeater system of claim 5 wherein said attachment means comprises:
   adhesive attachment means for adhesively fastening said PCB to a surface of a case of the IR-controlled device adjacent the connecting wires.

7. In a control signal repeater system for receiving infrared (IR) control signals by a receiver at a first location and for outputting a first signal containing control information from the IR control signals to a second location where duplicate control signals are output to an IR-controlled device at a third location containing an IR detector with connecting wires connecting the IR detector to a control logic which responds to electrical signals in said connecting wires where said electrical control signals are typically output by said IR detector in response to IR signals entering the IR detector, a signal repeater for controlling the IR-controlled device without directing a duplicate IR control signal into the IR-controlled device, comprising:
   a) signal receiver means at the second location for receiving said first signal from said receiver and for outputting a second signal containing said control information from the IR control signals; and,
   b) signal transmitter means at the second location for receiving said second signal and for transmitting a non-light energy signal directly into said connecting wires of the IR-controlled device at the third location to induce voltage signals therein containing said control information from the IR signal repeater whereby said IR detector is bypassed.

8. The signal repeater for a control signal repeater system of claim 7 wherein said signal transmitter means comprises:
   a) antenna means disposed close adjacent to the connecting wires; and,
   b) transmitter means connected to said antenna means for transmitting said energy signal into said antenna means.

9. The signal repeater for a control signal repeater system of claim 8 wherein:
   a) said antenna means comprises a radio frequency (RF) antenna; and,
   b) said transmitter means comprises an RF transmitter.

10. The signal repeater for a control signal repeater system of claim 8 wherein:
    a) said antenna means comprises a conductive coil; and,
    b) said transmitter means comprises a current signal transmitter.

11. The signal repeater for a control signal repeater system of claim 8 wherein said antenna means comprises:
    a) a printed circuit board (PCB);
    b) a conductive pattern on said PCB; and,
    c) attachment means for attaching said PCB to the IR-controlled device close adjacent the connecting wires.

12. The signal repeater for a control signal repeater system of claim 11 wherein said attachment means comprises:
    adhesive attachment means for adhesively fastening said PCB to a surface of a case of the IR-controlled device adjacent the connecting wires.

13. A method of operating a control signal repeater system to receive infrared (IR) control signals at a first location and cause duplicate control signals to be output at a second location to an IR-controlled device at a third location containing an IR detector with connecting wires connecting the IR detector to a control logic which responds to electrical signals in said connecting wires where said electrical control signals are typically output by said IR detector in response to IR signals entering the IR detector without directing a duplicate IR control signal into the IR-controlled device, comprising the steps of:
    a) at the first location,
       a1) receiving the IR control signals, and
       a2) outputting a first signal containing control information from the IR control signals; and,
    b) at the second location,
       b1) receiving the first signal,
       b2) outputting a second signal containing said control information from the IR control signals, and
       b3) transmitting a non-light energy signal corresponding to the second signal directly into said connecting wires of the IR-controlled device at the third location to induce voltage signals therein containing said control information from the IR control signals whereby said IR detector is bypassed.

14. The method of claim 13 wherein said step of transmitting a non-light energy signal into the connecting wires of the IR-controlled device comprises the steps of:
    a) disposing an antenna close adjacent to the connecting wires; and,
    b) transmitting the non-light energy signal into the antenna.

15. The method of claim 14 wherein the antenna comprises a radio frequency (RF) antenna and said step of transmitting the non-light energy signal into the antenna comprises:

transmitting an RF signal into the antenna.

16. The method of claim 14 wherein the antenna comprises a conductive coil and said step of transmitting the non-light energy signal into the antenna comprises:

transmitting a current signal into the coil.

17. The method of claim 14 wherein the antenna comprises a printed circuit board (PCB) with a conductive pattern on the PCB and additionally including the step of:

attaching the PCB to the IR-controlled device close adjacent the connecting wires.

18. The method of claim 17 wherein said step of attaching the PCB to the IR-controlled device close adjacent the connecting wires comprises:

adhesively fastening the PCB to a surface of a case of the IR-controlled device adjacent the connecting wires.

* * * * *